(12) United States Patent
Yoshii

(10) Patent No.: US 8,404,067 B2
(45) Date of Patent: Mar. 26, 2013

(54) RECYCLABLE VINYL CHLORIDE CARPET AND PROCESS FOR PRODUCING THEREOF

(75) Inventor: Hideshi Yoshii, Nara (JP)

(73) Assignee: Suminoe Textile Co., Ltd., Osaka-shi (JP)

( * ) Notice: Subject to any disclaimer, the term of this patent is extended or adjusted under 35 U.S.C. 154(b) by 930 days.

(21) Appl. No.: 11/921,168

(22) PCT Filed: May 30, 2006

(86) PCT No.: PCT/JP2006/310710
§ 371 (c)(1), (2), (4) Date: Jul. 8, 2009

(87) PCT Pub. No.: WO2006/129624
PCT Pub. Date: Dec. 7, 2006

(65) Prior Publication Data
US 2009/0274861 A1 Nov. 5, 2009

(30) Foreign Application Priority Data
May 30, 2005 (JP) .................. 2005-157020

(51) Int. Cl.
*B32B 37/15* (2006.01)
*A47G 27/02* (2006.01)

(52) U.S. Cl. ............. 156/231; 156/238; 156/72; 428/95

(58) Field of Classification Search .......... 428/95; 156/72, 324, 307.1; 427/180, 196, 202, 203
See application file for complete search history.

(56) References Cited

U.S. PATENT DOCUMENTS

| | | | |
|---|---|---|---|
| 3,988,508 A * | 10/1976 | Lissant | 526/344.2 |
| 6,316,075 B1 * | 11/2001 | Desai et al. | 428/87 |
| 6,686,411 B2 * | 2/2004 | Iguchi et al. | 524/500 |
| 6,786,988 B1 * | 9/2004 | Bell | 156/72 |
| 6,814,826 B1 * | 11/2004 | Bell | 156/94 |
| 6,860,953 B1 * | 3/2005 | Grizzle et al. | 156/72 |
| 7,045,590 B2 * | 5/2006 | Bell | 528/480 |
| 7,521,107 B2 * | 4/2009 | Bell | 428/97 |
| 2002/0165311 A1 * | 11/2002 | Iguchi et al. | 524/500 |
| 2004/0014885 A1 * | 1/2004 | Nakajima et al. | 525/70 |

(Continued)

FOREIGN PATENT DOCUMENTS

| | | |
|---|---|---|
| JP | 04-339645 | 11/1992 |
| JP | 06-220332 | 8/1994 |

(Continued)

OTHER PUBLICATIONS

Machine translation of JP 09-056567A, Kida et al., Mar. 4, 1997.*

(Continued)

*Primary Examiner* — Cheryl Juska
(74) *Attorney, Agent, or Firm* — Edwards Wildman Palmer LLP

(57) ABSTRACT

A production method according to the present invention is characterized in that the method comprises a step of obtaining a vinyl chloride resin paste sol by mixing a plasticizer and a vinyl chloride resin, a granulated material mixing step of mixing a granulated material having a grain size of 300 μm or less obtained by granulating a discarded carpet material containing a vinyl chloride resin with the vinyl chloride resin paste sol, a filling material adding step of obtaining a backing composition by mixing an inorganic filling material with a paste sol obtained at the granulated material mixing step, and a step of integrally laminating the backing composition on a back surface of a surface skin member.

10 Claims, 3 Drawing Sheets

U.S. PATENT DOCUMENTS

| | | | |
|---|---|---|---|
| 2004/0062903 A1* | 4/2004 | Evans et al. | 428/95 |
| 2005/0008814 A1* | 1/2005 | Bell | 428/97 |
| 2005/0042413 A1* | 2/2005 | Bell | 428/95 |
| 2005/0118386 A1* | 6/2005 | Desai et al. | 428/95 |
| 2007/0275207 A1* | 11/2007 | Higgins et al. | 428/95 |
| 2009/0017253 A1* | 1/2009 | Bell | 428/87 |

FOREIGN PATENT DOCUMENTS

| | | |
|---|---|---|
| JP | 09-056567 | 3/1997 |
| JP | 2000-051055 | 2/2000 |
| JP | 2003-064572 | 3/2003 |
| JP | 2004-113384 | 4/2004 |
| JP | 2004-141434 | 5/2004 |
| JP | 2004-147792 | 5/2004 |
| JP | 2004-299293 | 10/2004 |
| JP | 2006326152 A * | 12/2006 |

OTHER PUBLICATIONS

Machine translation of JP 2003-064572A, Ikezaki et al., Mar. 5, 2003.*

Machine translation of JP 2004-113384A, Onari et al., Apr. 15, 2004.*

* cited by examiner

RECYCLABLE VINYL CHLORIDE CARPET AND PROCESS FOR PRODUCING THEREOF

TECHNICAL FIELD

The present invention relates to a recycled carpet using a discarded carpet material containing a vinyl chloride resin as a structural material of a backing layer, and also relates to a production method thereof.

BACKGROUND TECHNIQUE

At the time of producing a carpet, a large amount of cut materials will be generated. Furthermore, the amount of carpets to be discarded from, e.g., households or offices is enormous. Conventionally, in many cases, such a discarded carpet material was subjected to incineration. However, in the case of incinerating a carpet lined with a backing agent comprised of a vinyl chloride resin, there was a problem that toxic substances are likely generated. Furthermore, in recent years, from the viewpoint of the global environment protection, it is strongly requested to collect a discarded carpet material for recycling. In order to cope with such social needs, a technology for producing a new carpet by recycling a discarded carpet material containing a vinyl chloride resin has been developed.

For example, a technique for recycling a discarded carpet material of a vinyl chloride resin is known. In this technique, a granulated material having an average grain size of 3 mm or less obtained by granulating a discarded carpet material of a vinyl chloride resin into pieces is mixed with a vinyl chloride resin backing layer laminated on a back surface of a carpet base fabric in a dispersed manner by dispersing the granulated material (see Patent Document 1).

Furthermore, a technique for producing a recycled tile carpet is also known. In this technique, after granulating a collected discarded tile carpet lined with a vinyl chloride resin, air separation by a dust separation device is performed to recover a vinyl chloride granulated material in which fiber components of a surface pile layer were separated and removed. Thereafter, the recovered granulated material is minutely granulated and sorted, then mixed with a vinyl chloride series resin paste sol at a ratio of 0.5 to 20 wt %, and then applied to a prescribed surface. On this surface, a pile tufted base fabric is laminated to thereby produce the recycled tile carpet. (see Patent Document 2).

Furthermore, another technique for producing a recycled tile carpet is also known. In this technique, after shaving off a backing layer of a discarded tile carpet lined with a vinyl chloride resin, the granulated member thereof is mixed with a vinyl chloride series resin paste sol at a ratio of 0.5 to 20 wt %, and then they are coated on a coating belt with a coater. Thereafter, a pile tufted base fabric is laminated on a base fabric to thereby obtain the recycled tile carpet (see Patent Document 3).

With the aforementioned techniques, it becomes possible to provide a recycled carpet in which a discarded carpet material containing a vinyl chloride resin is used as a part of a constituent material of a backing layer.

[Patent Document 1] Japanese Unexamined Laid-open Patent Publication No. H4-339645, A
[Patent Document 2] Japanese Unexamined Laid-open Patent Publication No. 2004-113384, A
[Patent Document 3] Japanese Unexamined Laid-open Patent Publication No. 2004-141434, A

DISCLOSURE OF THE INVENTION

Problems to be Solved by the Invention

In each of the aforementioned techniques, however, the content ratio of a discarded carpet material capable of being contained in a backing layer of a recycled carpet is 20 wt % at a maximum, and thus the ratio of a discarded carpet material containable in a backing layer was small. As mentioned above, the aforementioned prior techniques were small in recycle ratio of a discarded carpet material, which could not attain sufficient recycling of a collected discarded carpet.

The present invention was made in view of the aforementioned technical background, and aims to provide a vinyl chloride resin recycled carpet capable of containing a discarded carpet material in a backing layer of the recycled carpet at a content ratio higher than that in a conventional recycled carpet, and also aims to provide a production method thereof.

In order to attain the aforementioned objects, the present invention provides the following means.

[1] A production method of a vinyl chloride resin recycled carpet, comprising:
a step of obtaining a vinyl chloride resin paste sol by mixing a plasticizer and a vinyl chloride resin;
a granulated material mixing step of mixing a granulated material having a grain size of 300 μm or less obtained by granulating a discarded carpet material containing a vinyl chloride resin with the vinyl chloride resin paste sol;
a filling material adding step of obtaining a backing composition by mixing an inorganic filling material with a paste sol obtained at the granulated material mixing step; and
a step of integrally laminating the backing composition on a back surface of a surface skin member.

[2] A production method of a vinyl chloride resin recycled carpet, comprising:
a step of obtaining a vinyl chloride resin paste sol by mixing a plasticizer, a lubricant and a vinyl chloride resin;
a granulated material mixing step of mixing a granulated material having a grain size of 300 μm or less obtained by granulating a discarded carpet material containing a vinyl chloride resin with the vinyl chloride resin paste sol;
a filling material adding step of obtaining a backing composition by mixing an inorganic filling material with a paste sol obtained at the granulated material mixing step; and
a step of integrally laminating the backing composition on a back surface of a surface skin member.

[3] The production method of a vinyl chloride resin recycled carpet as recited in the aforementioned Item 1 or 2, wherein a content ratio of the granulated material in the backing composition is 25 to 60 mass %.

[4] The production method of a vinyl chloride resin recycled carpet as recited in any one of the aforementioned Items 1 to 3, wherein a grain size of the granulated material is 1 to 200 μm.

[5] The production method of a vinyl chloride resin recycled carpet as recited in any one of the aforementioned Items 1 to 4, wherein an aspect ratio of the granulated material is 1 to 1.5.

[6] The production method of a vinyl chloride resin recycled carpet as recited in any one of the aforementioned Items 1 to 4, wherein an aspect ratio of the granulated material is 1 to 1.3.

[7] The production method of a vinyl chloride resin recycled carpet as recited in any one of the aforementioned Items 2 to 6, wherein a content ratio of the lubricant in the backing composition is 1 to 5 mass %.

[8] The production method of a vinyl chloride resin recycled carpet as recited in any one of the aforementioned Items 2 to 7, wherein as the lubricant, an olefin component having a carbon number of 7 to 24 and polyoxyethylene polyoxypropylene decylether are used.

[9] The production method of a vinyl chloride resin recycled carpet as recited in the aforementioned Item 8, wherein the olefin component having a carbon number of 7 to 24 is an olefin component of 1-hexadecene and 1-octadecene.

[10] The production method of a vinyl chloride resin recycled carpet as recited in the aforementioned Item 8 or 9, wherein a combined mass ratio of the lubricant is olefin component/polyoxyethylene polyoxypropylene decylether=60/40 to 75/25.

[11] The production method of a vinyl chloride resin recycled carpet as recited in one of the aforementioned Items 1 to 10, wherein the backing composition is applied to a continuously traveling exfoliative belt to form a backing layer and the back surface of the surface skin layer is pressed on a uncured surface of the backing layer, whereby the backing composition is integrally laminated on the back surface of the surface skin layer.

[12] The production method of a vinyl chloride resin recycled carpet as recited in one of the aforementioned Items 1 to 10, wherein the backing composition is applied to a continuously traveling exfoliative belt to form a backing lower layer, subsequently grains having an average grain size of 3 mm or less obtained by granulating a discarded carpet material containing a vinyl chloride resin are sprayed on a uncured surface of the backing lower layer, and then the backing composition is further applied thereto to form a backing upper layer, and the back surface of the surface skin member is pressed on the backing upper layer, whereby the backing composition is integrally laminated on the back surface of the surface skin member.

[13] A vinyl chloride recycled carpet in which pile is implanted on an upper surface of a base fabric and a backing layer comprised of a vinyl chloride resin composition is formed on a lower surface of the base fabric, characterized in that
the vinyl chloride resin composition constituting the backing layer is a composition containing a granulated material having a grain size of 300 µm or less obtained by granulating a discarded carpet material containing a vinyl chloride resin by 25 to 60 mass %.

Effects of the Invention

In the aforementioned inventions [1] and [2], since a granulated material containing a vinyl chloride resin having a grain size of 300 µm or less is used as the granulated material of a discarded carpet material, it is possible to contain a discarded carpet material in the backing layer of the recycled carpet at a content ratio higher than that in a conventional recycled carpet. Furthermore, since after mixing the granulated material with the vinyl chloride resin paste sol, the inorganic filling material is mixed therewith, the viscosity increase of the backing composition can be restrained, resulting in an improved coating property of the backing composition.

Furthermore, in the aforementioned invention [2], since the lubricant is contained, the viscosity increase of the backing composition can be sufficiently restrained.

Furthermore, in the aforementioned invention [3], since the recycle ratio of the discarded carpet material is large, it is possible to sufficiently contribute to the global environmental protection.

Furthermore, in the aforementioned invention [4], since the grain size of the granulated material is 10 to 200 µm, it is possible to contain a discarded carpet material in the backing layer of the recycled carpet at a higher content ratio.

Furthermore, in the aforementioned invention [5], since the aspect ratio of the granulated material is 1 to 1.5, the specific surface area of the granulated material becomes small, which can effectively prevent the viscosity increase due to plasticizer absorption.

Furthermore, in the aforementioned invention [6], since the aspect ratio of the granulated material is 1 to 1.3, the specific surface area of the granulated material becomes smaller, which can more effectively restrain the viscosity increase due to plasticizer absorption.

Furthermore, in the aforementioned invention [7], since the content ratio of the lubricant in the backing composition is 1 to 5 mass %, the viscosity increase of the backing material can be restrained and a bleed phenomenon of the lubricant can be effectively restrained.

Furthermore, in the aforementioned invention [8], since as the lubricant an olefin component having a carbon number of 7 to 24 and polyoxyethylene polyoxypropylene decylether are used, the viscosity increase of the backing composition can be sufficiently restrained.

Furthermore, in the aforementioned invention [9], since the olefin component having a carbon number of 7 to 24 is an olefin component comprised of 1-hexadecene and 1-octadecene, the viscosity increase of the baking composition can be more sufficiently restrained.

Furthermore, in the aforementioned invention [10], since the combined mass ratio of the lubricant is olefin component/ polyoxyethylene polyoxypropylene decylether=60/40 to 75/25, it is possible to improve the fluid status of the backing composition (no deposition occurs, and no separation of the lubricant tends to occur).

Furthermore, in the aforementioned invention [11], a vinyl chloride resin recycled carpet can be produced at an excellent productivity.

Furthermore, in the aforementioned invention [12], since grains having an average grain size of 3 mm or less obtained by granulating a discarded carpet material containing a vinyl chloride resin can also be recyclable, the recycle ratio of a discarded carpet material can be further increased.

Furthermore, in the aforementioned invention [13], since the vinyl chloride resin composition constituting the backing layer contains a granulated material having a grain size of 300 µm or less obtained by granulating a discarded carpet material containing a vinyl chloride resin, a discarded carpet material can be contained in the backing layer of the recycled carpet by 25 to 60 mass % which is a content ratio higher than that in a conventional recycled carpet. Since the recycle ratio of a discarded carpet material is large as mentioned above, it is possible to sufficiently contribute to the global environmental protection.

DESCRIPTION OF THE REFERENCE NUMERALS

Figure 1:
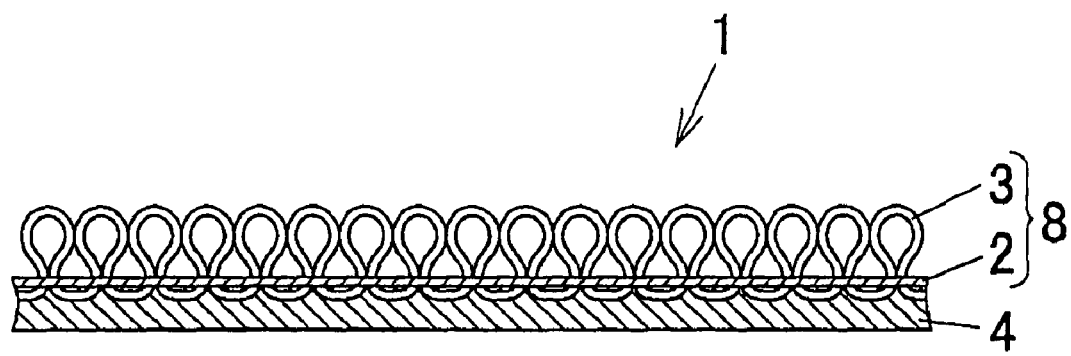
FIG. 1 is a cross-sectional view showing an embodiment of a vinyl chloride resin recycled carpet according to the present invention.

1 . . . Vinyl chloride resin recycled carpet
2 . . . Base fabric
3 . . . Pile
4 . . . Backing layer
4A . . . Backing upper layer
4B . . . Backing lower layer
8 . . . Surface skin member
10 . . . Grain
30 . . . Exfoliative belt

BEST MODE FOR CARRYING OUT THE INVENTION

A production method of a vinyl chloride resin recycled carpet according to the present invention will be explained. Initially, a plasticizer and a vinyl chloride resin (virgin vinyl chloride resin) are mixed to obtain a vinyl chloride resin paste sol. It is preferable to simultaneously mix a lubricant. At this time, the mixing order of the plasticizer, the lubricant and the vinyl chloride resin is not specifically limited. As the virgin vinyl chloride resin, it is preferable to use a virgin vinyl chloride resin having a grain size of 1 to 10 μm.

The plasticizer is not limited to a specific one. For example, dioctyl phthalate (DOP), dibutyl phthalate, and dihexyl phthalate can be exemplified. Among other things, it is preferable to use a DOP, considering that the particle interface of the base resin (vinyl chloride resin) can be more evenly turned into a lubricated gel.

Next, a granulated material having a grain size of 300 μm or less obtained by granulating a discarded carpet material having a vinyl chloride resin is mixed with the vinyl chloride resin paste sol (granulated material mixing step). Then, an inorganic filling material is mixed with the paste sol obtained at the granulated material mixing step to obtain a backing composition (filling material adding step). Thereafter, the backing composition is integrally laminated on the back surface of the surface skin member. Thus, a vinyl chloride resin recycled carpet 1 according to the present invention can be obtained.

As mentioned above, in this production method, since, as the granulated material of a discarded carpet material containing a vinyl chloride resin, a granulated material having a grain size of 300 μm or less is used, a discarded carpet material can be contained in the backing layer 4 of the recycled carpet at a content ratio higher than that in a conventional one (e.g., 25 to 60 mass %). Furthermore, since the granulated material is mixed with the vinyl chloride resin paste sol and then the inorganic filling material is mixed therewith, the viscosity increase of the backing composition can be restrained, which in turn can improve the coating property of the backing composition.

The discarded carpet material containing a vinyl chloride resin is not limited to a specific one. For example, cut materials produced during a carpet production and/or carpets to be discarded from households and/or offices can be exemplified. Among other things, a backing material containing a vinyl chloride resin can be preferably used. As the discarded carpet material, a discarded carpet material partially containing pile or fibers of, e.g., a nonwoven fabric can be used.

As the granulated material of a discarded carpet material containing a vinyl chloride resin, a granulated material having a grain size of 300 μm or less is used. When the grain size exceeds 300 μm, especially in cases where a discarded carpet material is contained at a content ratio higher than that in a conventional one, the fluidity of the obtained backing composition deteriorates and deposition will be generated. Therefore, such granulated material cannot be used. Among other things, it is preferable to use a granulated material having a grain size of 10 to 200 μm. In this case, there is an advantage that a discarded carpet material can be contained in the backing layer of the recycled carpet at a higher content ratio. The aforementioned grain size denotes a major axial length of a granulated material in cases where a granulated material is a deformed material.

As the granulated material of the discarded carpet material containing a vinyl chloride resin, it is preferable to use a granulated material having an aspect ratio of 1 to 1.5. When the aspect ratio falls within the range of 1 to 1.5, the specific surface area of the granulated material becomes small, which can effectively restrain viscosity increase of the backing composition due to plasticizer absorption. Among other things, it is especially preferable to use a granulated material having an aspect ratio of 1 to 1.3. The aforementioned aspect ratio denotes a value obtained by dividing a major axial length of a granulated material by a minor axial length thereof.

The granulating method for obtaining the granulated material of a discarded carpet material containing a vinyl chloride resin is not limited to a specific one. For example, the following method can be exemplified. In the method, a backing layer of a vinyl chloride resin is exfoliated from a discarded carpet material and the exfoliated discarded material is granulated using a grinding machine. The obtained granulated material is separated into a resin component and a fiber component in accordance with a wind vibrational classification, etc., (a granulating method disclosed in JP 2003-47878, A can be employed) and the separated resin component is further granulated (see Japanese Patent Application No. 2004-310179).

The inorganic filling material is not limited to a specific one. For example, calcium carbonate, calcium oxide, barium sulfate, barium carbonate, magnesium hydroxide, aluminum hydroxide, talc, and kaolin clay can be exemplified.

The lubricant is not limited to a specific one. For example, an olefin component having a carbon number of 7 to 24 and polyoxyethylene polyoxypropylene decylether can be exemplified. Among other things, it is preferable to use an olefin component having a carbon number of 7 to 24 and polyoxyethylene polyoxypropylene decylether. In this case, the viscosity increase of the backing component can be sufficiently restrained. Furthermore, although the olefin component having a carbon number of 7 to 24 is not limited to a specific one, it is preferable to use an olefin component comprised of 1-hexadecene and 1-octadecene.

Furthermore, the combined mass ratio of the lubricant preferably falls within the range of olefin component/polyoxyethylene polyoxypropylene decylether=60/40 to 75/25. By setting the ratio within this range, it is possible to improve the fluid status of the backing composition (e.g., with no deposition, and with no separation of the lubricant).

The content ratio of the lubricant in the backing composition is preferable 1 to 5 mass %. By setting the ratio to 1 mass % or more, the viscosity increase of the backing composition can be restrained. By setting the ratio to 5 mass % or less, the bleed phenomenon of the lubricant can be effectively prevented. To the backing component, various additives, such as, e.g., stabilizer, or pigment, can be added.

Figure 3:
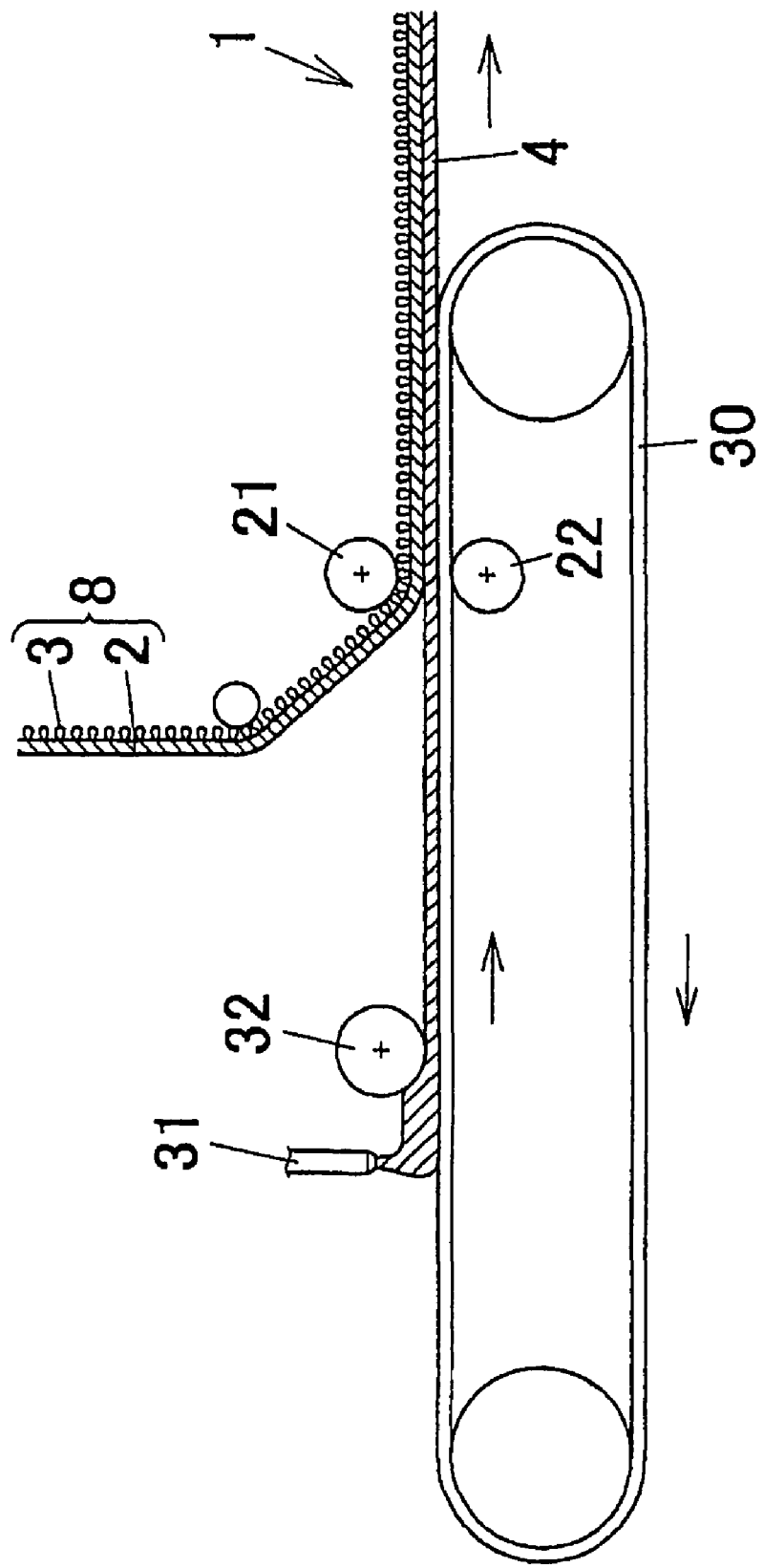
FIG. 3 is a schematic side view showing an example of a production method.

Next, an example of a method of integrally laminating the backing component on the back surface of the surface skin member is shown in FIG. 3. Initially, after applying the backing composition to a continuously traveling endless exfoliative belt 30 from a supplying pipe 31, the backing composition is formed to have a constant thickness with a coater 32. Subsequently, on the uncured surface of the backing composition (backing layer) formed to have a constant thickness, the back surface of the surface skin member 8 in which pile is implanted on the upper surface of a base fabric 2 is laminated. Then, they are passed between a pair of upper and lower pressing rollers 21 and 22 and pressed. Thus, the backing composition is integrally laminated on the back surface of the surface skin member 8.

The obtained laminated member is introduced into a not-illustrated heat-treating furnace and heated to turn the backing composition into a gel to form a backing layer 4. Thus, a vinyl chloride recycled carpet shown in FIG. 1 is produced. That is, in this vinyl chloride resin recycled carpet 1, on the back surface of the surface skin member 8 comprising a base fabric 2 and pile 3 implanted on the upper surface of the base fabric, the backing layer 4 of a vinyl chloride resin composition is formed. The vinyl chloride resin composition constituting the backing layer 4 is a composition containing a granulated material having a grain size of 300 μm or less obtained by granulating a discarded carpet material containing a vinyl chloride resin.

Figure 4:
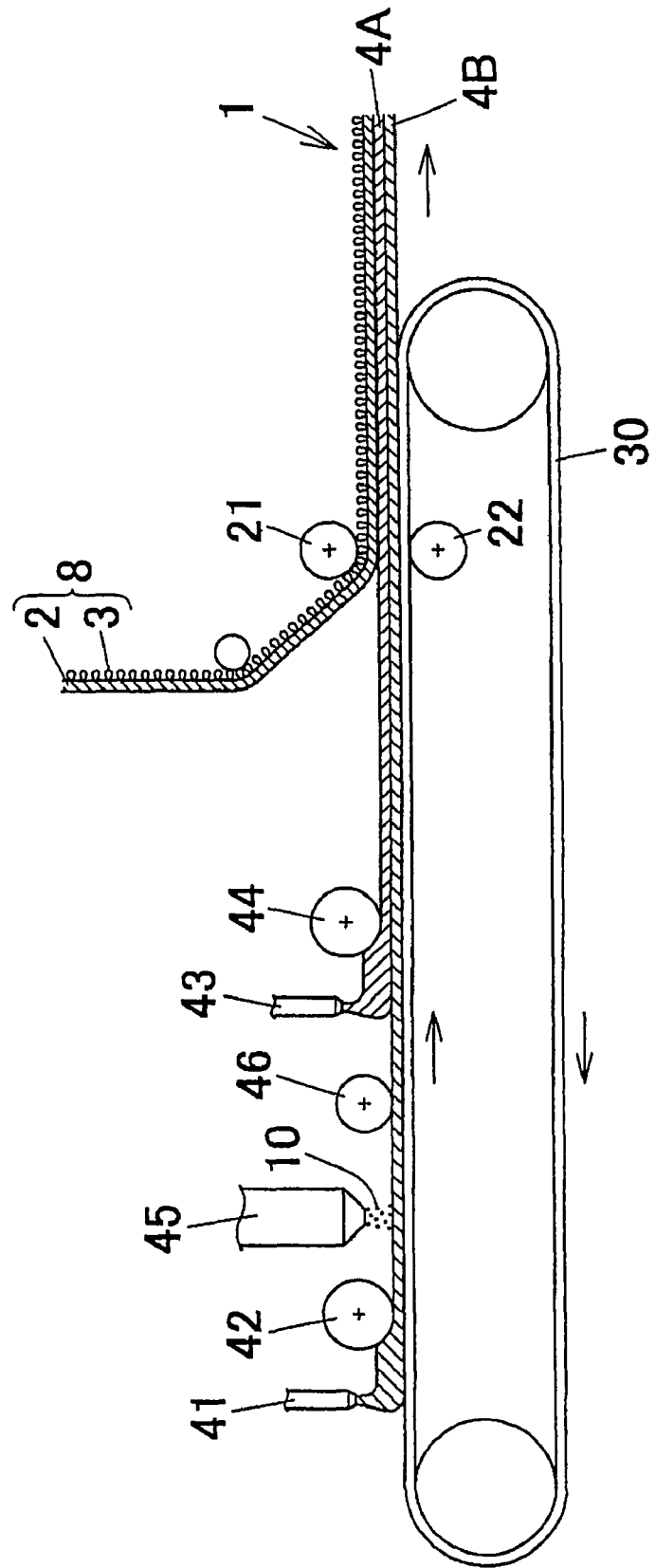
FIG. 4 is a schematic side view showing another example of a production method.

Next, another example of a method of integrally laminating the backing composition on a back surface of the surface skin member is shown in FIG. 4. Initially, applying a backing composition to a continuously traveling endless exfoliative belt 30 from a first supplying pipe 41, the backing composition is formed to have a constant thickness. Subsequently, on the uncured surface of the backing composition (backing lower layer) formed to have a constant thickness, a granulated material having an average grain size of 3 mm or less obtained by granulating a discarded carpet material containing a vinyl chloride resin are sprayed from a spraying device 45. Thereafter, they are pressed with a pressing roller 46 and the backing composition is applied thereto and formed to have a constant thickness with a second coater 44. On the uncured surface of the backing composition (backing upper layer) formed to have a constant thickness, the back surface of a surface skin member 8 in which pile 3 is implanted on an upper surface of a base fabric 2 is laminated. Then, they are passed between a pair of upper and lower pressing rolls 21 and 22 to be press-bonded. Thus, the backing composition is integrally laminated on the back surface of the surface skin member 8.

Figure 2:
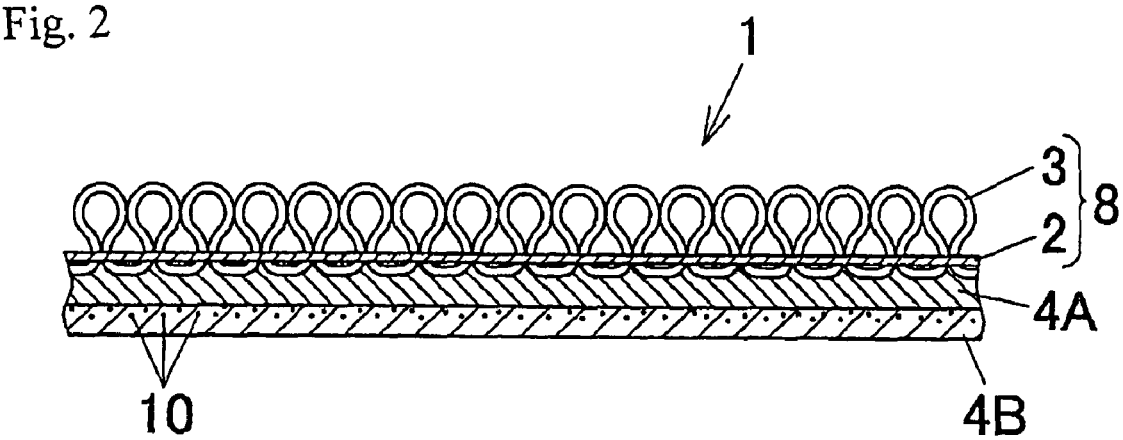
FIG. 2 is a cross-sectional view showing another embodiment of a vinyl chloride resin recycled carpet according to the present invention.

The obtained laminated member is introduced into a not-illustrated heat-treating furnace and heated to turn the backing composition into a gel to form a backing lower layer 4B and a backing upper layer 4A. Thus, the vinyl chloride recycled carpet shown in FIG. 2 is produced. That is, in this vinyl chloride resin recycled carpet 1, on the back surface of the surface skin member 8 comprising a base fabric 2 and pile 3 implanted on the upper surface of the base fabric, the backing layer 4 of a vinyl chloride resin composition is formed. The vinyl chloride resin composition constituting the backing layer 4 is a composition containing a granulated material having a grain size of 300 μm or less obtained by granulating a discarded carpet material containing a vinyl chloride resin. The backing layer 4 is comprised of a backing lower layer 4B made of a vinyl chloride resin composition, a backing upper layer 4A of a vinyl chloride resin composition, and grains 10 having an average grain size of 3 mm or less buried in the backing lower layer 4B. The resin components of the grains 10 are melted by heat-induced gelation and integrated with the resin of the backing lower layer 4B (can be formed into a single layer). According to the vinyl chloride resin-recycled carpet 1 shown in FIG. 2, since the grains 10 having an average grain size of 3 mm or less obtained by granulating a discarded carpet material containing a vinyl chloride resin can also be recycled, the recycling rate of a discarded carpet material can be further increased.

Furthermore, according to the present invention, since the vinyl chloride resin backing composition constituting the backing layer 4 contains granulated materials having a grain size of 300 μm or less obtained by granulating a discarded carpet material containing a vinyl chloride resin, it becomes possible to contain a discarded carpet material in the backing layer 4 of the recycled carpet material at a content ratio of 25 to 60 mass % which is higher than a content ratio in a conventional recycled carpet. Since the recycling rate of a discarded carpet can be increased as mentioned above, it can be contributed to the global environmental protection.

The heating temperature for the gelatification is preferably set to 150 to 190° C., and the heating time is usually 5 to 15 minutes which is sufficient for the heating.

In this invention, the base fabric 2 is not limited to a specific one. For example, spunbonded nonwoven fabric, needlepunched nonwoven fabric, and woven fabric can be exemplified. The raw material of the base fabric 2 is not limited to a specific one. For example, thermoplastic fibers, such as, e.g., polyester series fibers, polyamide series fibers, or polyolefin series fibers, complex fibers of these fibers, semisynthetic fibers, such as, e.g., acetate fibers, regenerated fibers, such as, e.g., rayon, natural fiber, such as, e.g., hemp or cotton, or cotton mixing of these fibers, can be exemplified.

Furthermore, the material of the pile 3 is not limited to a specific one. For example, a fiber product made of polyester fibers, nylon fibers, polypropylene fibers, acryl fibers, rayon fibers, etc., can be preferably used. In addition, a product made of natural fibers, such as, e.g., hemp, cotton, or wool, can be exemplified. The form of the pile 3 is also not specifically limited, and a cut pile, a loop pile, etc., can be exemplified.

Furthermore, in order to give dimensional stability, a glass base fabric or a polyester base fabric, etc., can be disposed between the surface skin member 8 and the backing layer 4. In the case of employing the structure shown in FIG. 4, it is preferable to laminate a glass base fabric, a polyester base fabric, etc., under the grains 10 by passing the base fabric under the first coater 42.

The vinyl chloride recycled carpet 1 of the present invention is not limited to a specific one, and can be used as, for example, a tile carpet or a floor mat. Among other things, it can be preferably used as a tile carpet.

EXAMPLES

Next, concrete examples of this invention will be explained, but not limited thereto.

Example 1

A backing layer (discarded carpet material) was peeled off from a used tile carpet (comprising a base fabric and a backing layer made of a vinyl chloride resin composition laminated on a back surface of a pile implanted surface skin member), and the backing layer was granulated with a grinding machine. The obtained granulated materials were separated into a resin component and a fiber component by wind vibrational classification. The obtained granulated material of the resin component was 250 μm in average grain size and the aspect ratio thereof was 1.3.

Next, carbon black (pigment) 3.2 mass parts and Ba/Zn series stabilizer 0.1 mass parts were added to a DOP 94 mass parts and sufficiently agitated and mixed. Thereafter, a lubricant Y (containing 1-hexadecene about 56 mass % and 1-octadecene about 43 mass %) 5.2 mass parts and a lubricant Z (polyoxyethylene polyoxypropylene decylether) 2.5 mass parts were added and sufficiently agitated and mixed. Subsequently, a vinyl chloride resin (virgin vinyl chloride resin) having an average grain size of 5 μm was added by 100 mass parts and sufficiently agitated and mixed to obtain a vinyl chloride resin paste sol. The granulated material (resin component) 188 mass parts was added to the vinyl chloride resin paste sol and sufficiently agitated and mixed. Thereafter, calcium carbonate (filling material) 195 mass parts was added and then sufficiently agitated and mixed to obtain a backing composition.

Next, as shown in FIG. 3, to the continuously traveling endless exfoliative belt 30 (on the surface of the belt, a polytetrafluoroethylene layer was coated), the backing composition was applied from the supplying pipe 31. Thereafter, they are formed to have a constant thickness with a coater 32. Then, on the uncured surface of the formed backing composition (backing layer) formed to have a constant thickness, the back surface of the surface skin member 8 with nylon fiber pile 3 having an areal weight of 450 g/m$^2$ was laid on the upper surface of a base fabric 2 made of a PET (polyethylene terephthalate) having an areal weight of 120 g/cm$^2$, and they were passed between a pair of upper and lower pressing rolls 21 and 22 to be bonded under pressure. Then, the backing composition was heated at 160° C. to turn into a gel. Thus, a vinyl chloride recycled carpet 1 as shown in FIG. 1 was obtained.

Example 2

A vinyl chloride recycled carpet 1 was obtained in the same manner as in Example 1 except that grains material having an average grain size of 150 μm (aspect ratio of 1.2) was used as the granulated material.

Example 3

A vinyl chloride recycled carpet 1 was obtained in the same manner as in Example 1 except that grains having an average grain size of 100 μm (aspect ratio of 1.1) were used as the granulated members.

Example 4, 5

A vinyl chloride recycled carpet 1 was obtained in the same manner as in Example 1 except that the blending quantity of the lubricant was set as shown in Table 1.

Example 6

A vinyl chloride recycled carpet 1 was obtained in the same manner as in Example 1 except that as the lubricant, only a lubricant Y (containing 1-hexadecene about 56 mass % and 1-octadecene about 43 mass %) was used.

Example 7

A vinyl chloride recycled carpet 1 was obtained in the same manner as in Example 1 except that as the lubricant, only a lubricant Z (polyoxyethylene polyoxypropylene decylether) was used.

Example 8

A vinyl chloride recycled carpet 1 was obtained in the same manner as in Example 1 except that as the filling material, calcium oxide was used in place of the calcium carbonate.

Example 9

A vinyl chloride recycled carpet 1 was obtained in the same manner as in Example 1 except that as the filling material, barium sulfate was used in place of calcium carbonate.

Example 10

A vinyl chloride recycled carpet 1 was obtained in the same manner as in Example 1 except that granulated materials were added so that the content ratio of the granulated material in the backing composition became 43.0 mass %.

Comparative Example 1

A vinyl chloride recycled carpet 1 was obtained in the same manner as in Example 1 except that granulated materials (resin component) having an average grain size of 320 μm (aspect ratio 1.3) were used as the granulated materials (resin component).

Comparative Example 2

Carbon black (pigment) 3.2 mass parts and Ba/Zn series stabilizer 0.1 mass parts were added to a DOP 94 mass parts and sufficiently agitated and mixed. Thereafter, a lubricant Y (containing 1-hexadecene about 56 mass % and 1-octadecene about 43 mass %) 5.2 mass parts and a lubricant Z (polyoxyethylene polyoxypropylene decylether) 2.5 mass parts were added and sufficiently agitated and mixed. Subsequently, granulated materials (resin component), which were the same as in Example 3, 188 mass parts were added and sufficiently agitated and mixed, then a vinyl chloride resin (virgin vinyl chloride resin) having an average grain size of 5 μm was added by 100 mass parts and sufficiently agitated and mixed to obtain vinyl chloride resin paste sol. Thereafter, calcium carbonate (filling material) 195 mass parts was added to the vinyl chloride resin paste sol and then sufficiently agitated and mixed to obtain a backing composition. Using this backing composition, a vinyl chloride resin recycled carpet was obtained in the same manner as in Example 1.

Comparative Example 3

Carbon black (pigment) 3.2 mass parts and Ba/Zn series stabilizer 0.1 mass parts were added to a DOP 94 mass parts and sufficiently agitated and mixed. Thereafter, a lubricant Y (containing 1-hexadecene about 56 mass % and 1-octadecene about 43 mass %) 5.2 mass parts and a lubricant Z (polyoxyethylene polyoxypropylene decylether) 2.5 mass parts were added and sufficiently agitated and mixed. Subsequently, a vinyl chloride resin (virgin vinyl chloride resin) having an average grain size of 5 μm was added by 100 mass parts and sufficiently agitated and mixed to obtain a vinyl chloride resin paste sol. To this vinyl chloride resin paste sol, calcium carbonate (filling material) 195 mass parts was added and sufficiently agitated and mixed. Thereafter, granulated materials (resin component) which were the same as in Example 3 were added by 188 mass parts to the vinyl chloride resin paste sol and sufficiently agitated and mixed to obtain a backing composition. Using this backing composition, a vinyl chloride resin recycled carpet was obtained in the same manner as in Example 1.

Comparative Example 4

Carbon black (pigment) 3.2 mass parts and Ba/Zn series stabilizer 0.1 mass parts were added to a DOP 94 mass parts and sufficiently agitated and mixed. Thereafter, a lubricant Y (containing 1-hexadecene about 56 mass % and 1-octadecene about 43 mass %) 5.2 mass parts and a lubricant Z (polyoxyethylene polyoxypropylene decylether) 2.5 mass parts were added and sufficiently agitated and mixed. Subsequently, a vinyl chloride resin (virgin vinyl chloride resin) having an average grain size of 5 μm was added by 100 mass parts and a granulated material (resin component), which was the same as in Example 3, 188 mass parts were simultaneously added and sufficiently agitated and mixed to obtain vinyl chloride resin paste sol. Thereafter, calcium carbonate (filling material) 195 mass parts was added to the vinyl chloride resin paste sol and then sufficiently agitated and mixed to obtain a backing composition. Using this backing composition, a vinyl chloride resin recycled carpet was obtained in the same manner as in Example 1.

TABLE 1

| | | | Comp. Ex. 1 | Ex. 1 | Ex. 2 | Ex. 3 | Ex. 4 | Ex. 5 |
|---|---|---|---|---|---|---|---|---|
| Composition/ | DOP(plasticizer) | (1) | 94 | 94 | 94 | 94 | 94 | 94 |
| Mass parts | Lubricant y (1-hexadecene/1-octadecene) | (3) | 5.2 | 5.2 | 5.2 | 5.2 | 4.6 | 5.7 |
| | Lubricant Z (polyoxyethylene polyoxypropylene decylether) | (3) | 2.5 | 2.5 | 2.5 | 2.5 | 3.0 | 2.0 |
| | Carbon black (pigment) | (2) | 3.2 | 3.2 | 3.2 | 3.2 | 3.2 | 3.2 |
| | Ba/Zn series stabilizer | (2) | 0.1 | 0.1 | 0.1 | 0.1 | 0.1 | 0.1 |
| | Vinyl chloride resin | (4) | 100 | 100 | 100 | 100 | 100 | 100 |
| | Granulated material (ave. grain size 320 μm) (aspect ratio 1.3) | (5) | 188 | — | — | — | — | — |
| | Granulated material (ave. grain size 250 μm) (aspect ratio 1.3) | | — | 188 | — | — | — | — |
| | Granulated material (ave. grain size 150 μm) (aspect ratio 1.2) | | — | — | 188 | — | — | — |
| | Granulated material (ave. grain size 100 μm) (aspect ratio 1.1) | | — | — | — | 188 | 188 | 188 |
| | Calcium carbonate | (6) | 195 | 195 | 195 | 195 | 195 | 195 |
| Content ratio of granulated material in backing composition (mass %) | | | 32.0 | 32.0 | 32.0 | 32.0 | 32.0 | 32.0 |
| Viscosity of backing material ($1 \times 10^{-5}$ MPa·s) | | | Immeasurable | 4.9 | 4.3 | 4.0 | 4.6 | 4.4 |
| Evaluation of the fluid status of backing material | | | Sandy/muddy | Good | Good | Good | Good | Good |

Numeral in ( ) denotes a blending order

TABLE 2

| | | Ex. 6 | Ex. 7 | Ex. 8 | Ex. 9 | Ex. 10 |
|---|---|---|---|---|---|---|
| DOP (plasticizer) | (1) | 94 | 94 | 94 | 94 | 94 |
| Lubricant Y (1-hexadecene/1-octadecene) | (3) | 7.7 | — | 5.2 | 5.2 | 5.2 |
| Lubricant Z (polyoxyethylene polyoxypropylene decylether) | (3) | — | 7.7 | 2.5 | 2.5 | 2.5 |
| Carbon black (pigment) | (2) | 3.2 | 3.2 | 3.2 | 3.2 | 3.2 |
| Ba/Zn series stabilizer | (2) | 0.1 | 0.1 | 0.1 | 0.1 | 0.1 |
| Vinyl chloride resin | (4) | 100 | 100 | 100 | 100 | 100 |
| Granulated material (ave. grain size 100 μm) (aspect ratio 1.1) | (5) | 188 | 188 | 188 | 188 | 352 |
| Calcium carbonate | (6) | 195 | 195 | — | — | 31 |
| Calcium oxide | | — | — | 195 | — | — |
| Barium sulfate | | — | — | — | 195 | — |
| Content ratio of granulated material in backing composition (mass %) | | 32.0 | 32.0 | 32.0 | 32.0 | 43.0 |
| Viscosity of backing material ($1 \times 10^{-5}$ MPa·s) | | 5.0 | 2.6 | 4.4 | 4.2 | 4.9 |
| Evaluation of the fluid status of backing material | | *1 | Slightly deposited | Good | Good | Good |

Numeral in ( ) denotes blending order,
*1 . . . Part of lubricant Y is separated

TABLE 3

| | Comp. Ex. 2 | | Comp. Ex. 3 | | Comp. Ex. 4 | |
|---|---|---|---|---|---|---|
| DOP (plasticizer) | 94 | (1) | 94 | (1) | 94 | (1) |
| Lubricant Y (1-hexadecene/1-octadecene) | 5.2 | (3) | 5.2 | (3) | 5.2 | (3) |
| Lubricant Z (polyoxyethylene polyoxypropylene decylether) | 2.5 | (3) | 2.5 | (3) | 2.5 | (3) |
| Carbon black (pigment) | 3.2 | (2) | 3.2 | (2) | 3.2 | (2) |
| Ba/Zn series stabilizer | 0.1 | (2) | 0.1 | (2) | 0.1 | (2) |

TABLE 3-continued

|  | Comp. Ex. 2 |  | Comp. Ex. 3 |  | Comp. Ex. 4 |  |
|---|---|---|---|---|---|---|
| Vinyl chloride resin | 100 | (5) | 100 | (4) | 100 | (4) |
| Granulated material (ave. grain size 100 μm) (aspect ratio 1.1) | 188 | (4) | 188 | (6) | 188 | (4) |
| Calcium carbonate | 195 | (6) | 195 | (5) | 195 | (5) |
| Content ratio of granulated material in backing composition (mass %) | 32.0 |  | 32.0 |  | 32.0 |  |
| Viscosity of backing material (1 × 10$^{-5}$ MPa · s) | 5.8 |  | 6.8 |  | 6.3 |  |
| Evaluation of the fluid status of backing material | Dispersion defect |  | Dispersion defect |  | Poor fluidity |  |

Numeral in ( ) denotes blending order

The measurement of the viscosity in Tables was performed using a BL type viscometer (#4 rotor, 6 rpm, measured after 1 minute).

Evaluations of the fluid status of each backing component obtained as mentioned above are shown in Tables 1-3. In Examples 1-5, and 8-10, although discarded carpet materials were contained in the backing layer of the recycled carpet at a high content ratio, the fluid status of the backing component was good (no deposition, and no separation of lubricant), and a high quality recycled carpet was produced.

Furthermore, in Example 6, although a part of the lubricant Y was separated, the fluid status of the backing composition was relatively good. Although discarded carpet materials were contained in the backing layer of the recycled carpet at a high content ratio, a relatively high quality recycled carpet was produced. Furthermore, in Example 7, although slight deposition was observed in the backing composition, the fluid status of the backing composition was relatively good. Although discarded carpet materials were contained in the backing layer of the recycled carpet at a high content ratio, a relatively high quality recycled carpet was produced.

To the contrary, in Comparative Example 1 in which the average grain size of the granulated material was 320 μm, the fluid status of the backing composition was in a sandy/muddy status, which was poor. In Comparative Example 2 in which a granulated material, a virgin vinyl chloride resin and a calcium carbonate were added to the lubricant in this order, the backing composition was in a poor dispersion state. The backing composition could not be lined in good condition. In Comparative Example 4 in which a virgin vinyl chloride resin and a granulated material were simultaneously added to the plasticizer and mixed, and then calcium carbonate was further added thereto, the fluidity of the backing composition was poor, and therefore the backing composition could not be lined in good condition.

This application claims priority to Japanese Patent Application No. 2005-157020 filed on May 30, 2005, the entire disclosure of which is incorporated herein by reference in its entirety.

It should be appreciated that the terms and descriptions herein are used only for explaining embodiments of the present invention, and the present invention is not limited to them. The present invention permits any design modifications within the scope of the present invention defined by the appended claims unless they deviate from its spirit of the present invention.

INDUSTRIAL APPLICABILITY

According to the production method of the present invention, since a discarded carpet material can be contained in a backing layer of a recycled carpet at a content ratio higher than that in a conventional one, it can contribute to the global environmental protection. Furthermore, in the vinyl chloride recycled carpet of the present invention, since the recycling rate of a discarded carpet material is large, it can sufficiently contribute to the global environment protection. Thus, the vinyl chloride resin recycled carpet produced by the production method of this invention or the vinyl chloride resin recycled carpet of this invention can be used as, for example, a tile carpet or a floor carpet.

The invention claimed is:

1. A production method for making a carpet comprising a vinyl chloride resin backing containing a discarded carpet material, said method comprising:
   a step of obtaining a vinyl chloride resin paste sol by mixing a plasticizer, a lubricant and a vinyl chloride resin;
   a granulated material mixing step of mixing a granulated material having a grain size of 300 μm or less obtained by granulating the discarded carpet material containing a vinyl chloride resin with the vinyl chloride resin paste sol;
   a filling material adding step of obtaining a backing composition by mixing an inorganic filling material with a paste sol obtained at the granulated material mixing step; and
   a step of integrally laminating the backing composition on a back surface of a surface skin member, said surface skin member comprising a base fabric and pile implanted on the upper surface of said basic fabric,
   wherein as the lubricant, an olefin component having a carbon number of 7 to 24 and polyoxyethylene polyoxypropylene decylether are used.

2. The production method of a vinyl chloride resin recycled carpet as recited in claim 1, wherein a content ratio of the granulated material in the backing composition is 25 to 60 mass %.

3. The production method of a vinyl chloride resin recycled carpet as recited in claim 1, wherein a grain size of the granulated material is 10 to 200 μm.

4. The production method of a vinyl chloride resin recycled carpet as recited in claim 1, wherein an aspect ratio of the granulated material is 1 to 1.5.

5. The production method of a vinyl chloride resin recycled carpet as recited in claim 1, wherein an aspect ratio of the granulated material is 1 to 1.3.

6. The production method of a vinyl chloride resin recycled carpet as recited in claim 1, wherein a content ratio of the lubricant in the backing composition is 1 to 5 mass %.

7. The production method of a vinyl chloride resin recycled carpet as recited in claim 1, wherein the olefin component having a carbon number of 7 to 24 is an olefin component of 1-hexadecene and 1-octadecene.

8. The production method of a vinyl chloride resin recycled carpet as recited in claim 1, wherein a combined mass ratio of the lubricant is olefin component/polyoxyethylene polyoxypropylene decylether=60/40 to 75/25.

9. The production method of a vinyl chloride resin recycled carpet as recited in claim 1, wherein the backing composition is applied to a continuously traveling exfoliative belt to form a backing layer and the back surface of the surface skin layer is pressed on a uncured surface of the backing layer, whereby the backing composition is integrally laminated on the back surface of the surface skin layer.

10. The production method of a vinyl chloride resin recycled carpet as recited in claim 1, wherein the backing composition is applied to a continuously traveling exfoliative belt to form a backing lower layer, subsequently grains having an average grain size of 3 mm or less obtained by granulating a discarded carpet material containing a vinyl chloride resin are sprayed on a uncured surface of the backing lower layer, and then the backing composition is further applied thereto to form a backing upper layer, and the back surface of the surface skin member is pressed on the backing upper layer, whereby the backing composition is integrally laminated on the back surface of the surface skin member.

* * * * *